United States Patent [19]

Staley et al.

[11] Patent Number: 4,913,486

[45] Date of Patent: Apr. 3, 1990

[54] SUNROOF AND LATCHING ASSEMBLY THEREFOR

[75] Inventors: Dennis W. Staley, Birmingham; Antony W. Chamings, Warren, both of Mich.

[73] Assignee: ASC Incorporated, Southgate, Mich.

[21] Appl. No.: 302,375

[22] Filed: Jan. 27, 1989

[51] Int. Cl.⁴ .................... B60J 7/057; B60J 7/19
[52] U.S. Cl. .................... 296/223; 296/224; 292/DIG. 5
[58] Field of Search ............. 296/223, 224; 292/DIG. 5

[56] References Cited

U.S. PATENT DOCUMENTS

| 3,779,598 | 12/1973 | Lidington | 296/224 |
| 4,650,243 | 3/1987 | Hanley et al. | 296/224 X |
| 4,763,949 | 8/1988 | Haig | 296/224 X |

FOREIGN PATENT DOCUMENTS

| 168917 | 1/1951 | Austria | 296/223 |
| 2338798 | 2/1975 | Fed. Rep. of Germany | 296/224 |
| 3310502 | 9/1984 | Fed. Rep. of Germany | 296/223 |
| 18301 | 3/1914 | France | 296/223 |
| 2286017 | 5/1976 | France | 296/223 |
| 2286018 | 5/1976 | France | 296/223 |
| 7309884 | 1/1975 | Netherlands | 296/224 |
| 465339 | 4/1937 | United Kingdom | 296/224 |

Primary Examiner—Dennis H. Pedder
Attorney, Agent, or Firm—Arnold S. Weintraub; William D. Blackman

[57] ABSTRACT

A sliding sunroof assembly for a vehicle and a latching mechanism for such a sunroof assembly are disclosed.

A gear shaft has two drive gears disposed on opposite ends thereof which ride on gear guides on tracks, the gear guides having serrations formed thereon to engage teeth of the drive gears. A lock gear is provided centrally on the gear shaft, and one or more engaging members are normally biased into engagement with the lock gear to prevent rotation of the shaft. Movement of a handle disengages the engaging member or members from the lock gear, allowing the gear shaft to spin and allowing slidable movement of a sunroof panel. The latching mechanism enables the sunroof assembly to be latched in a plurality of positions between a fully closed portion and a fully open position.

5 Claims, 5 Drawing Sheets

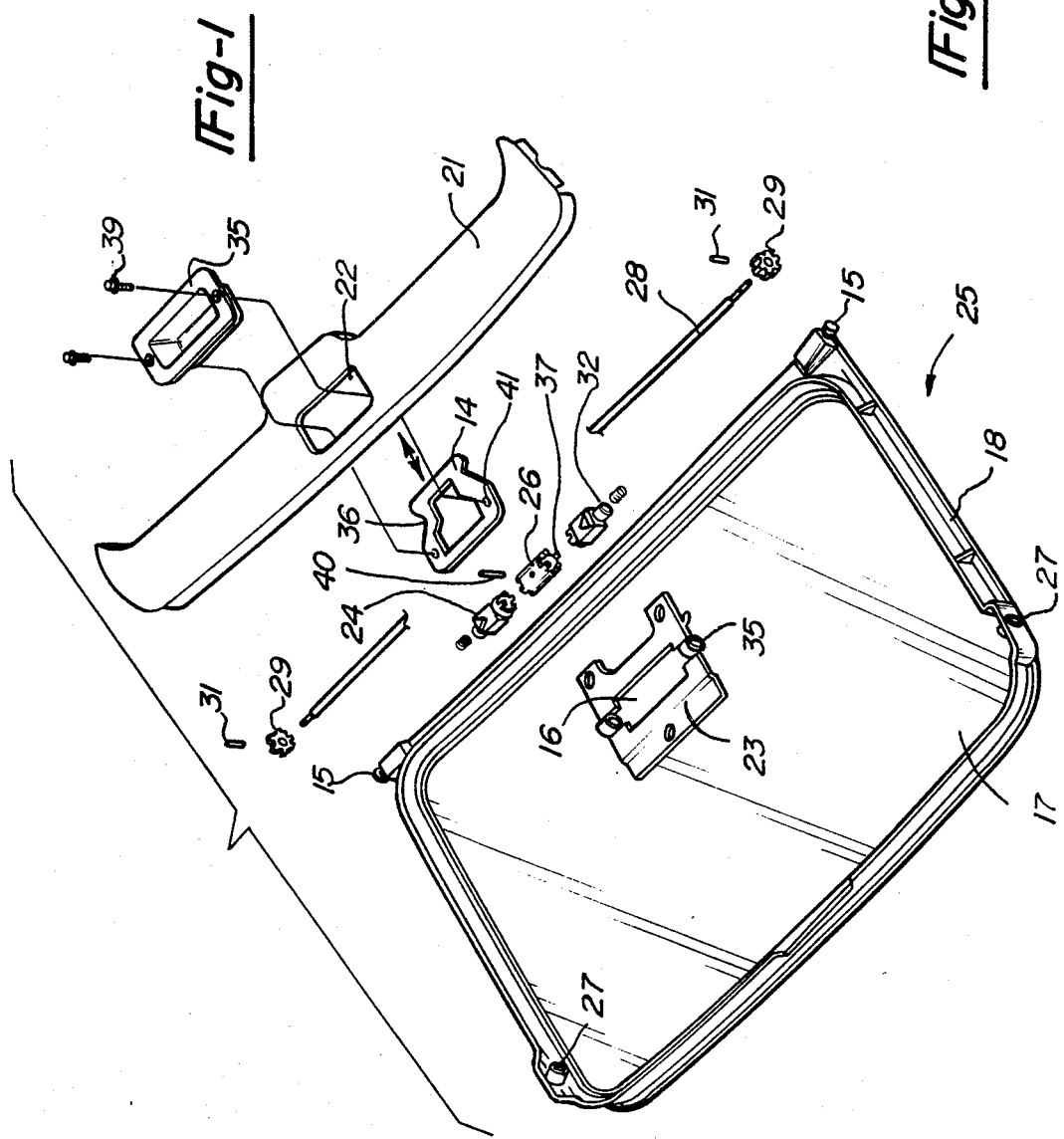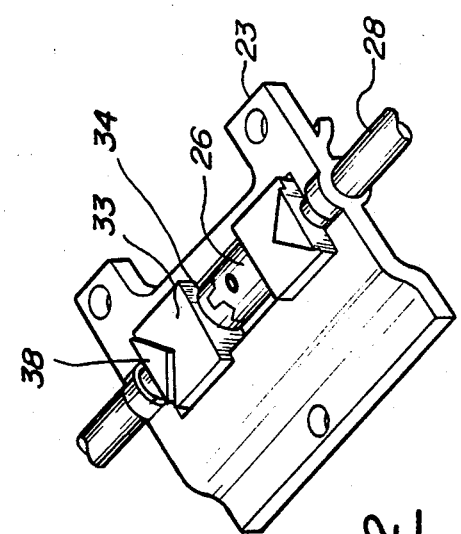

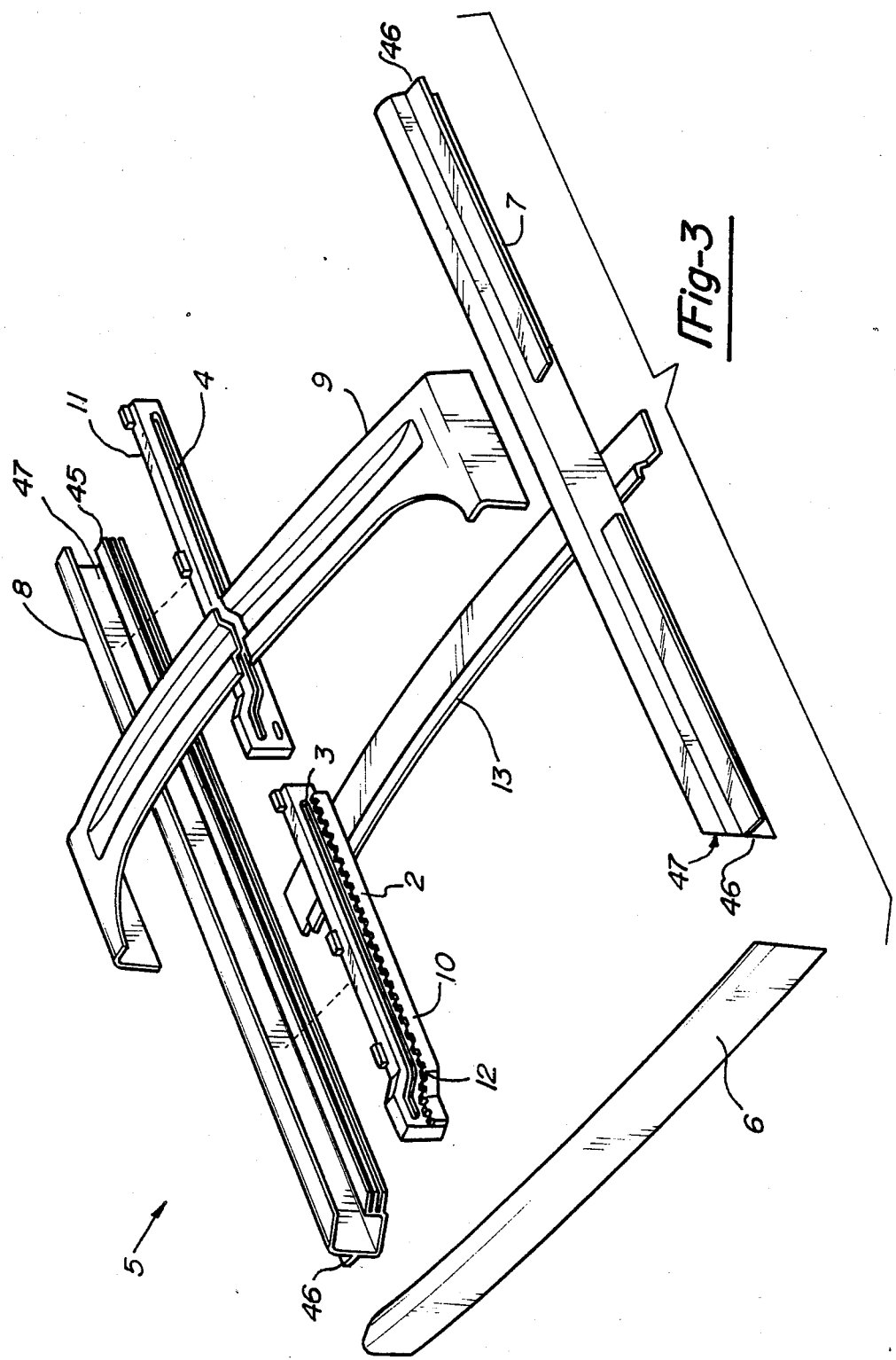

SUNROOF AND LATCHING ASSEMBLY THEREFOR

FIELD OF THE INVENTION

The present invention relates generally to vehicle closures. More particularly, the present invention relates to a sliding sunroof for a vehicle and a latching assembly therefor which allows for several partially opened positions in which the sunroof may be latched.

DESCRIPTION OF THE RELEVANT ART

Sunroof assemblies, for allowing an opening in the roof of a vehicle, are known and used in the automotive industry both in the original equipment market and in the automotive aftermarket. Efforts continue, however, to find a latching mechanism for use with a sunroof which is simple and easily manufactured so as to be relatively inexpensive and which will allow a sunroof to be latched in any of several partially opened positions. Such a sunroof and mechanism is provided by the present invention.

A brief discussion of some of the relevant art follows.

Perion U.S. Pat. No. 4,260,189 discloses a device for closing a sliding roof of an automobile involving a rack and pinion gear, in which the roof locks into a closed position. Perion does not provide for locking in a partially opened position.

Bienert U.S. Pat. No. 4,531,777 discloses a motor vehicle roof arrangement having a cover that can be slid and/or tilted out with respect to an opening in the roof. The cover is movable by means of an electric motor through at least one incompressible driving cable. The sunroof disclosed in Bienert may also be operated by use of a hand crank.

Haig U.S. Pat. No. 4,609,223 discloses a controller for a vehicle sunroof having two tracks mounted in a main frame, along opposite sides of a closure. Guides project laterally outward from the sides of the closure and the guides include cams or eccentrics that are positioned in the tracks, and are shaped so that rotation of the eccentrics raises and lowers the closure in the main frame. When the cams are rotated to a raised position they lock the sunroof in place.

Other sliding sunroofs for automotive vehicles are disclosed in Farmont U.S. Pat. No. 4,626,027, Furst U.S. Pat. No. 4,647,106 and Hanley U.S. Pat. No. 4,650,243.

Although the foregoing patents disclose a variety of vehicle sunroofs, a need in the industry still exists for a sunroof that is simple in design, has a minimum number of moving parts, and is inexpensive to manufacture. The present invention provides a new sunroof which answers this need.

SUMMARY OF THE INVENTION

The present invention provides a latching assembly for use with a sliding closure, comprising:

a first set of two opposed tracks, the tracks being substantially parallel, at least one of the tracks having serrations associated therewith to engage the teeth of a gear;

a gear shaft disposed between the tracks and having at least one drive gear attached thereto proximate an end thereof for rotation therewith, the drive gear being substantially cylindrical and having teeth therearound which fit engagingly into the serrations;

a lock gear attached to the gear shaft between the ends thereof, a handle assembly comprising:

an engaging member, the engaging member being disposed proximate the lock gear and being engagable therewith, means for gripping the handle assembly to cause the engaging member to move away from the lock gear, means for biasing the engaging member against the lock gear; the means for biasing normally forcing the engaging member into engagement with the lock gear to prevent rotation of the gear shaft; and wherein the latching assembly is latchable with the closure in a plurality of positions between a fully closed position and a fully open position.

The present invention also encompasses a sliding sunroof assembly suitable for installation in a vehicle, the sunroof assembly incorporating the latching assembly of the present invention.

Additional details regarding preferred embodiments may be found in the detailed description section. Throughout the following description and in the drawings, identical reference numbers are used to refer to the same component shown in multiple figures of the drawings, in which:

BRIEF DESCRIPTION OF THE DRAWINGS

FIG. 1 illustrates an exploded perspective view of the underside of a portion of a preferred embodiment of the present invention, including a sunroof panel and the handle assembly of the present invention.

FIG. 2 is a perspective view of the handle mounting member, showing the gear shaft, lock gear, and engaging members.

FIG. 3 is an exploded perspective view of the remainder of the sunroof assembly not shown in FIG. 1 as seen from above, which includes a rail portion and tracks which fit in the rails for guiding the sunroof panel.

FIG. 5A illustrates the latching assembly in a latched position and FIG. 5B illustrates the latching assembly in a open position for movement of the sunroof panel.

FIG. 6A shows the sunroof at a closed position, FIG. 6B shows the sunroof in a partially open position, and FIG. 6C shows the sunroof in a full, open position.

DETAILED DESCRIPTION OF THE PREFERRED EMBODIMENT

Figure 5A:
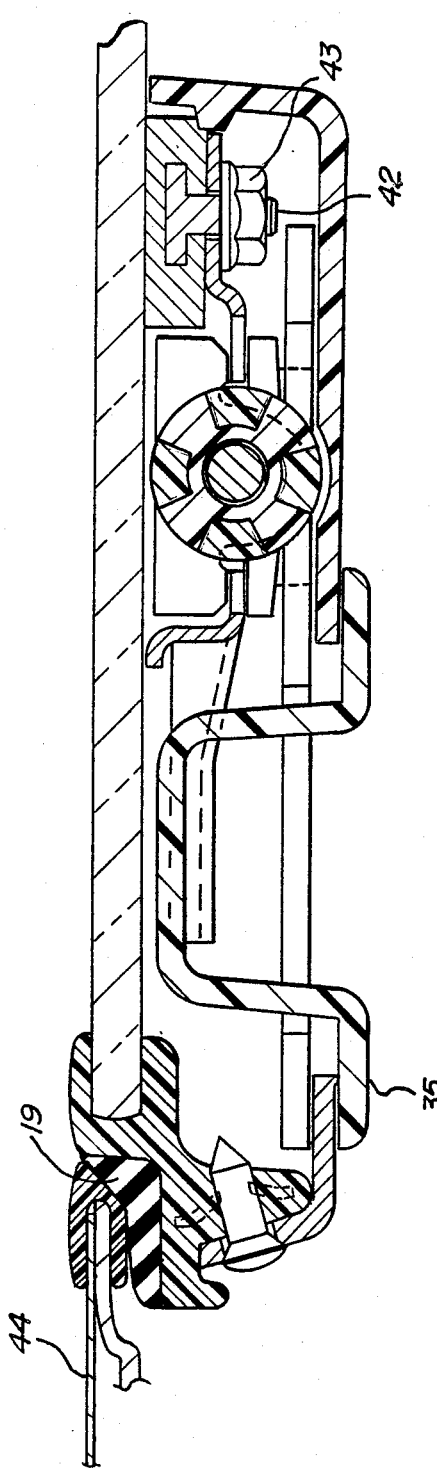
FIGS. 5A and 5B are side views, partially in cross-section, of the sunroof assembly of the present invention.

Referring now to FIGS. 3 and 5A, there is shown a vehicle having a roof portion 44 in which the present invention is adapted to be used. As shown in FIG. 3, a rail portion is shown generally at 5, with a front rail 6, two side rails 7, 8, and a reinforcement 9 connecting the side rails. Each of the rails 6, 7, 8 is formed of a sturdy material such as metal or high tensile strength plastic and is made up of three substantially planar sections joined together at angles in the range of 85°–100°, so that in cross-section a rail looks somewhat like the letter "c", with the opening 47 facing inwardly in the rail portion 5. The side rails 7, 8, also may have one or more ribs 45 attached to the inside edge of the lower planar section thereof. The side rails 7, 8 also may have positioning tabs 46 on the outward facing sides thereof opposite the opening 47 in each rail. The positioning tabs 46 help to support and locate the sunroof assembly in the roof 44 of a vehicle. A reinforcement 9 connects the side rails 7 and 8.

A front track 10 and a rear track 11 fit inside and face inwardly in the side rail 8. The tracks may be pressed in to the side rails, or may be retained in the side rails by threaded fasteners (not shown). The tracks 10, 11 each have guide slots 3,4 formed therein on the inwardly facing sides thereof to guide and support a sunroof panel as will be described herein. The other side rail 7 also has front and rear tracks 110, 111 similar to 10, 11 installed therein as may be seen from FIG. 4. The front track 10 includes a gear guide 2 having serrations 12 on the upper face thereof to guide and engage the teeth of a gear as will be described herein. A brace 13 may be provided to join and support the side rails 7,8 on the underside thereof.

Referring to FIGS. 1 and 2, the balance of the latch mechanism of the present invention is shown along with the underside of a window section 25 of the sunroof assembly. The window section 25 includes a sunroof panel 17, made of glass, metal, plastic, or other suitable material, which is held and surrounded by a frame 18. The sunroof panel 17, in one embodiment, may be made of tinted glass, and may have a reflective material on the outer surface thereof.

In the embodiment of FIG. 1 the frame 18 has guide pins 15 at the rear corners thereof for slidable engagement of the window section 25 the guide slots 4 of the rear tracks. This guides the window section for slidable movement thereof with respect to the tracks.

Figure 4:
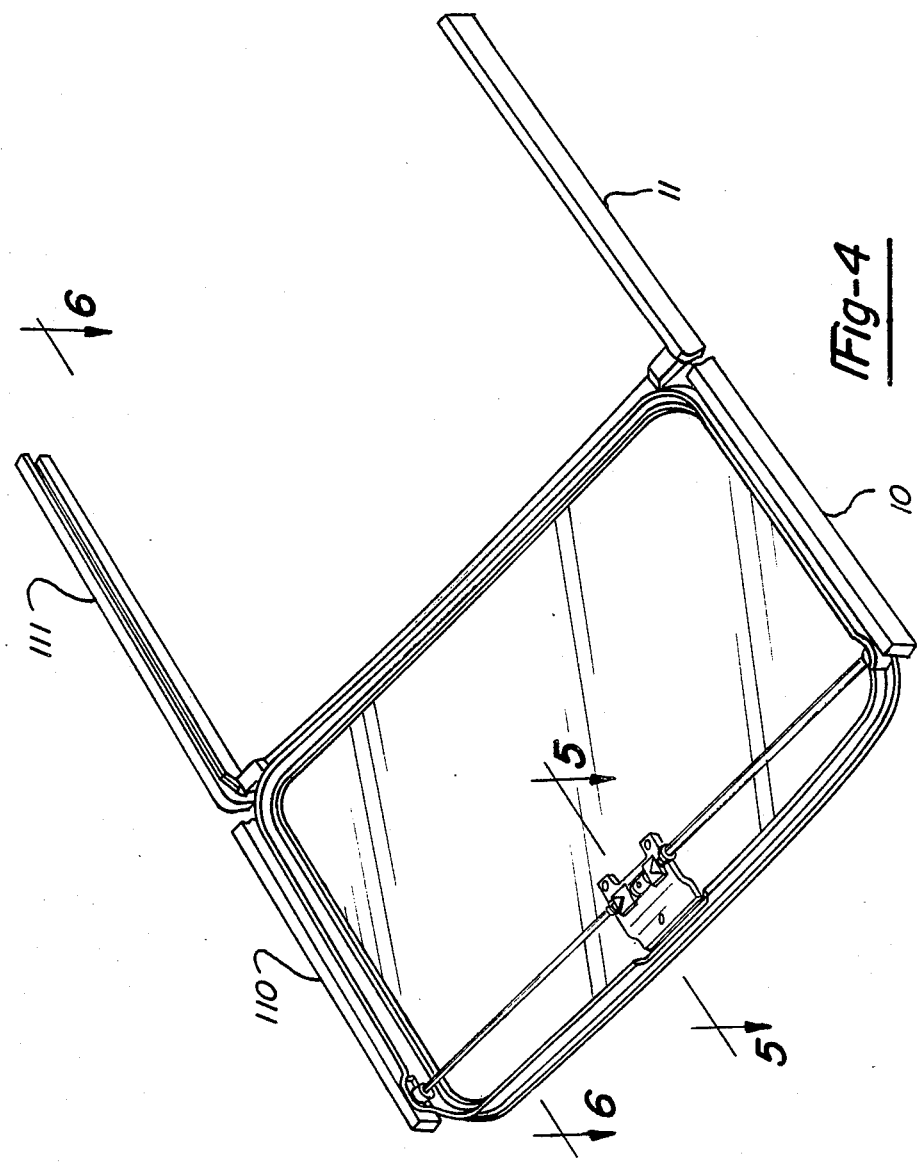
FIG. 4 is a perspective view of the underside of the sunroof panel and the track sections for guiding movement of the sunroof panel.

As shown in FIGS. 1, 2 and 4 a gear shaft 28 may fit through holes 27 formed in the frame 18, and the gear shaft 28 has drive gears 29 which are fixedly attached to the ends thereof for rotation therewith, for example, by roll pins 31 which fit through the drive gears and the gear shaft 28. As may be seen in FIG. 1, the drive gears 29 have teeth formed therearound, which are engagable with the serrations 12 of the gear guides 2 of the front tracks 10, 110 as illustrated in FIG. 3.

Figure 7:
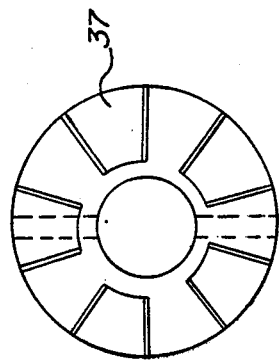
FIGS. 7 and 8 are illustrative examples of possible alternative gear arrangements for the ends of the lock gear.
Figure 8:
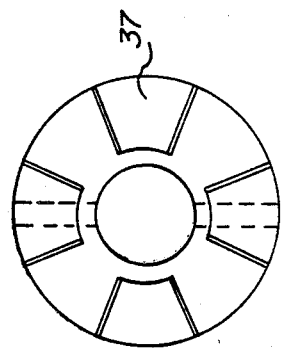

The gear shaft 28 also has a lock gear 26 mounted thereon and disposed between the drive gears 29. The lock gear 26 is fixedly attached to the gear shaft 28 for rotation therewith, such as, again by a roll pin 40 through the lock gear and the gear shaft. Alternatively, a threaded hole could be formed in the lock gear 26 and a threaded fastener such as an Allen screw could fit engagingly therein to fixedly hold the lock gear to the gear shaft. The lock gear 26 is generally cylindrical in shape and has teeth 37 formed thereon. In the embodiment illustrated, the teeth are at opposing ends of the cylinder of the lock gear and face outwardly. FIGS. 7 and 8 show alternative numbers of teeth 37 which may be used on the lock gear. The number of teeth is not critical.

Figure 5B:
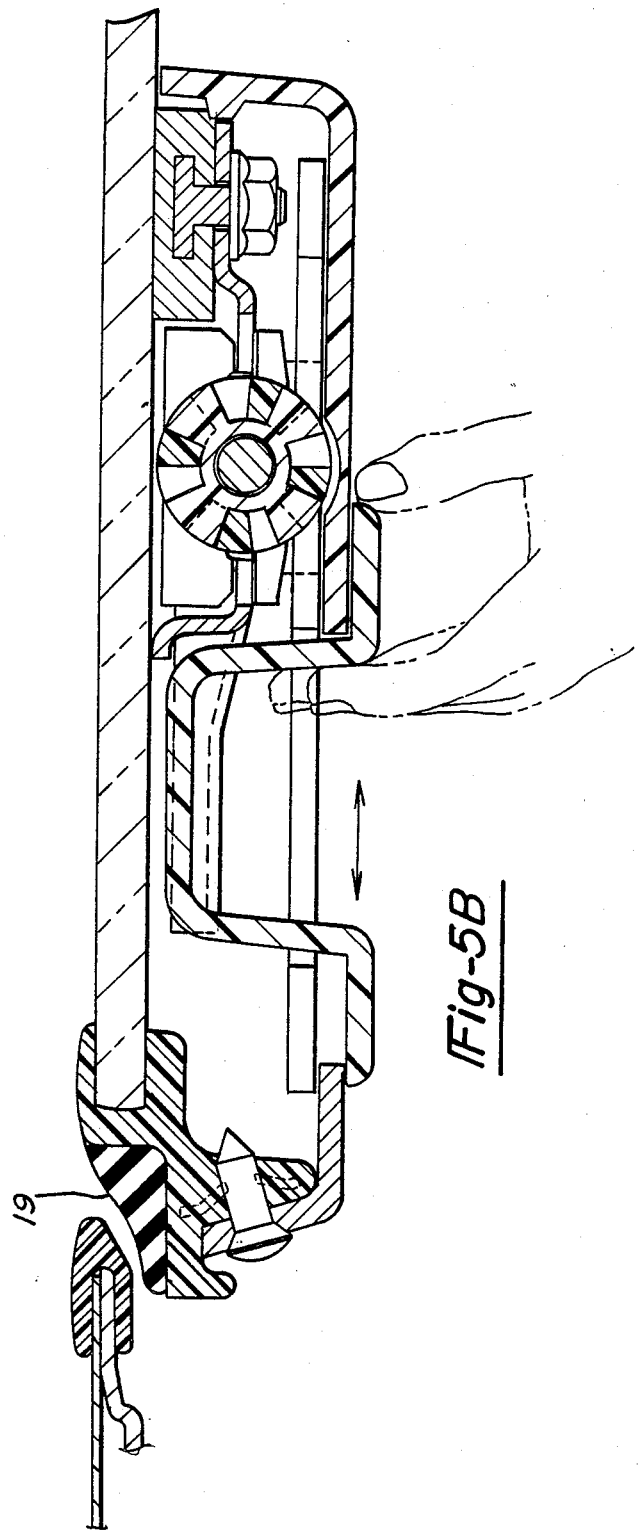
Figure 6A:
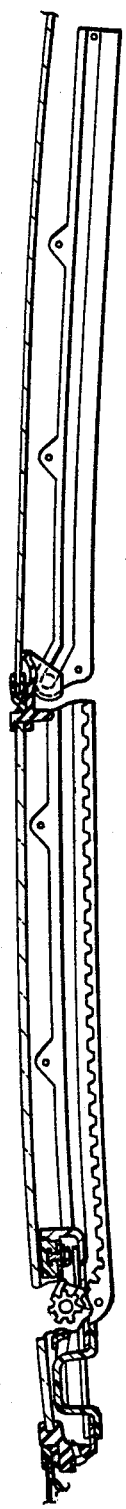
FIGS. 6A, 6B, and 6C are side views of the sunroof assembly showing the track and the latching mechanism of the present invention.
Figure 6B:
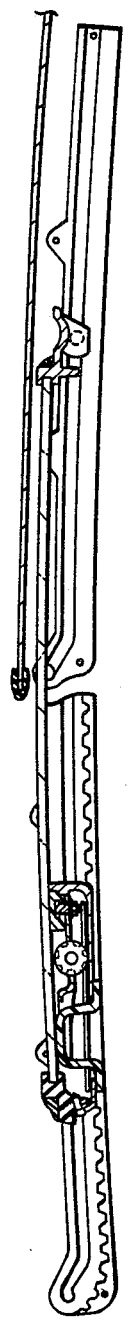
Figure 6C:
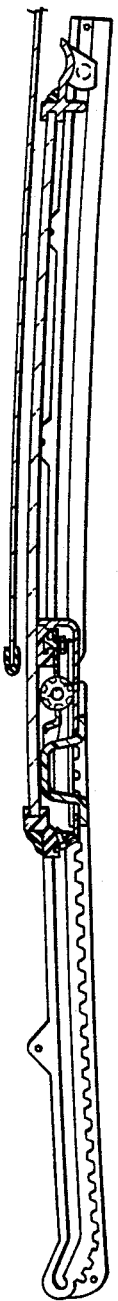

A handle assembly is shown in FIG. 1 and 2 and includes a handle mounting member 23, at least one engaging member 24, (of which two are shown in the embodiment depicted), springs 32 which act as a means for biasing the engaging member 24 into the lock gear 26, a disengaging plate 14, and a handle 35 which attaches to the disengaging plate 14. The handle mounting member 23 may be bonded to the panel 17. Alternatively, the handle mounting member 23 may be attached to the panel 17 by threaded fasteners, such as the stud 42 and nut 43 shown in FIGS. 5A and 5B. The handle mounting member 23 has a substantially rectangular hole 16 essentially in the middle thereof, and has guide holes 35 in the ends thereof at opposite sides of the rectangular hole 16 for supporting and guiding the gear shaft 28.

In the embodiment of FIGS. 1, 2, and 4, the engaging member 24 is made up of a body section 33 and a locking section 34, although the member 24 may be integrally cast as a single piece. The body section 33 and the locking section 34 share a common longitudinal axis along which is formed a cylindrical passage for receiving the gear shaft 28 therethrough. The locking section 34 has teeth formed thereon corresponding to the teeth on the lock gear. The teeth of the locking section are adapted to engagingly intermesh with the teeth of the lock gear, as is shown in FIG. 2. The body section 33 of each engaging member 24 has a cam lobe 38 formed thereon which points inwardly in the assembled latch mechanism. This cam lobe 38 functions as a cam means associated with the engaging member for moving the engaging member into disengagement with the lock gear as will be further described. A disengaging plate 14 seats on the upper surface of the engaging members 24 and has a notch 36 cut on each side thereof facing outwardly. The notches 36 in the disengaging plate 14 line up engagingly with the cam lobes 38 of the engaging members. The springs 32 function as a means for biasing the engaging members 24 against the lock gear, the springs normally causing the teeth of the locking section 34 of the engaging member 24 to engagingly intermesh with the teeth of the lock gear 26 to prevent rotation of the gear shaft 28. The disengaging plate 14 acts as a displacing member which cooperates with the cam means 38 to disengage the engaging member 24 from the lock gear 26 when the disengaging plate 14 is moved in the direction of the arrow shown in FIG. 1. This forces the cam lobes 38 of the engaging members to push the engaging members outwardly and away from the lock gear 26, thus disengaging the teeth of the engaging members 24 from the lock gear 26 and allowing the gear shaft 28 to spin. This allows for slidable movement of the panel with respect to the tracks 10, 110. A handle 35 is provided as a part of the handle assembly and fits into an opening in the disengaging plate 14 for movement thereof, and attaches thereto by the use of threaded fasteners 39 threadably engaging with threaded holes 41 in the disengaging plate 14. If a trim plate such as that shown at 21 is used, the hole 22 formed therein, to allow the handle 35 to fit therethrough, is large enough to allow for slidable movement of the handle 35 in the hole 22 and to allow threaded fasteners 39 to pass through the hole 22 and not attach the handle 35 to the trim plate 21. The handle 35 acts as a means for gripping the handle assembly to cause slidable movement of the disengaging plate 14 to which it is attached. This slidable movement of the disengaging plate 14 in the directions shown by the arrows in FIGS. 1 and 5B pushes the cam lobes 28 on the engaging members 24. This overcomes the force of the springs 32 and moves the engaging members outwardly to disengage the teeth of the engaging members from the teeth of the lock gear. The latching mechanism of the present invention is latchable in any position in which the teeth of the lock gear align with the teeth of the engaging members. This allows for the assembly being latchable with the closure in the closed position, in a fully open position, and in any of several partially opened positions. The front tracks 10, 110 are substantailly the same length as the rear tracks 11, 111 since the motion of the window section 25 is over the same distance in both the front and rear tracks. A weather strip seal 19 may be provided between the panel 17 and the roof 44 of a vehicle, and the seal 19 may attach to the frame 18 of the window section in one embodiment. The seal 19 acts as a means for sealing the underside of the sunroof assembly from the elements when the window section 25 is closed.

When the sunroof assembly of the present invention is in a latched position, whether open, closed or in between, the springs 32 will normally urge the engaging members to engage the teeth or projections thereof with the teeth of the lock gear to prevent the lock gear from turning. This also prevents the gear shaft from turning since the lock gear is fixedly attached to the gear shaft, and prevents the window section from slidably moving, since the drive gears are also fixedly attached to the gear shaft, and are engaged in the gear guides.

The latching mechanism of the present invention, as herein described, provides a means for latching the panel 17 in a given position while allowing for unlatching and slidable movement of the panel when the handle 35 is pushed in a direction of desired motion.

The foregoing description is intended to be illustrative, and not restrictive. Many modifications of the present invention will occur to those skilled in the art. All such modifications within the scope of the amended claims are intended to be within the scope and spirit of the present invention.

While the present Figures and description depict and describe a manually operated sunroof assembly, the sunroof assembly of the present invention is easily adaptable for power use. The present invention is not limited to a manually operated sunroof assembly.

Having, thus, described the invention, what is claimed is:

1. A latching assembly for use with a sliding closure, comprising:
   (a) a first set of opposed tracks, the tracks being substantially parallel, at least one of the tracks having serrations associated therewith to engage the teeth of a gear;
   (b) a gear shaft disposed between the tracks;
   (c) at least one drive gear attached to the gear shaft proximate an end thereof for rotation therewith, the drive gear being substantially cylindrical and having teeth formed therearound which engage the serrations;
   (d) a lock gear attached to the gear shaft for rotation therewith;
   (e) a handle assembly comprising:
      (1) a manually movable handle;
      (2) an engaging member, the engaging member being disposed proximate the lock gear and being engagable therewith,
      (3) means for biasing the engaging member against the lock gear; and
      (4) means for disengaging the engaging member from the lock gear in response to movement of the handle.

2. A sliding sunroof assembly for installation in a vehicle, comprising:
   (a) a sunroof panel;
   (b) a first set of opposed tracks having guide slots formed therein for guiding movement of the panel, at least one of the tracks having serrations associated therewith for engaging the teeth of a gear;
   (c) a gear shaft rotatably attached to the panel;
   (d) at least one drive gear attached to the gear shaft proximate an end thereof, the drive gear being substantially cylindrical and having teeth formed therearound which engage the serrations;
   (e) a lock gear attached to the gear shaft for rotation therewith;
   (f) a handle assembly comprising:
      (1) a handle for grasping by a user of the assembly;
      (2) at least one engaging member disposed proximate the lock gear and being engagable therewith;
      (3) means for biasing the engaging member against the lock gear, the biasing means normally forcing the engaging member into engagement with the lock gear; and
      (4) means for disengaging the engaging member from the lock gear in response to movement of the handle.

3. The assembly of claim 2, further comprising:
   (a) a pair of opposed rails, each rail containing: a track of the first set of tracks, and
   (b) a second set of opposed tracks, a track of the second set of tracks being disposed in each of the rails, the second set of tracks being substantially the same length as the first set of tracks, and
   (c) guide pins, attached to the sunroof panel, which move in the second set of tracks.

4. The sunroof assembly of claim 2, wherein the handle assembly further comprises:
   a handle mounting member fixedly attached to the underside of the panel and having holes formed therethrough to rotatably receive the gear shaft therein.

5. A sliding sunroof assembly, comprising:
   (a) a rail portion for attaching to a vehicle roof and having a front rail and two side rails;
   (b) a front track and a rear track for each side rail, the tracks disposed facing inwardly in the side rails, a track guide slot formed in each front and rear track on the inwardly facing sides thereof, at least one of the front tracks having serrations associated therewith for guiding and engaging a drive gear;
   (c) a window section having a panel portion with a frame around the edge of the panel portion;
   (d) guide pins disposed on opposite sides of the frame which fit in the guide slots in the rear tracks for slidable movement of the window section therein;
   (e) means for sealing the underside of the sunroof assembly from the elements when the window section is closed;
   (f) a gear shaft rotatably attached to the panel portion;
   (g) at least one drive gear attached to an end of the gear shaft for rotation therewith, the drive gear having gear teeth thereon which are engagable with the serrations of the front track;
   (h) a lock gear attached to the gear shaft for rotation therewith; and
   (i) a handle assembly comprising:
      (1) a manually movable handle;
      (2) an engaging member which is adapted to engagingly intermesh with the lock gear;
      (3) means for biasing the engaging member against the lock gear, the biasing means normally urging the engaging member into engagement with the lock gear; and
      (4) means for disengaging the engaging member from the lock gear in response to movement of the handle.

* * * * *